US007085956B2

(12) United States Patent
Petersen et al.

(10) Patent No.: US 7,085,956 B2
(45) Date of Patent: Aug. 1, 2006

(54) SYSTEM AND METHOD FOR CONCURRENT LOGICAL DEVICE SWAPPING

(75) Inventors: David B. Petersen, Great Falls, VA (US); Michael J. Shannon, Wappingers Falls, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 10/134,254

(22) Filed: Apr. 29, 2002

(65) Prior Publication Data

US 2003/0204772 A1    Oct. 30, 2003

(51) Int. Cl.
    *G06F 11/00* (2006.01)
(52) U.S. Cl. .............................................. 714/6; 714/7
(58) Field of Classification Search .................... 714/4, 714/6, 47, 7; 711/112, 114
    See application file for complete search history.

(56) References Cited

U.S. PATENT DOCUMENTS

| 4,837,680 | A |   | 6/1989  | Crockett et al. ............ 364/200 |
|-----------|---|---|---------|-------------------------------------|
| 4,894,828 | A |   | 1/1990  | Novy et al. ................. 371/11.3 |
| 5,289,589 | A |   | 2/1994  | Bingham et al. ........... 395/425 |
| 5,327,531 | A |   | 7/1994  | Bealkowski et al. ........ 395/164 |
| 5,720,029 | A |   | 2/1998  | Kern et al. ............. 395/182.18 |
| 5,790,775 | A | * | 8/1998  | Marks et al. .................. 714/9 |
| 5,828,847 | A |   | 10/1998 | Gehr et al. ............ 395/200.69 |
| 5,870,537 | A | * | 2/1999  | Kern et al. ..................... 714/6 |
| 5,966,301 | A |   | 10/1999 | Cook et al. ................. 364/132 |
| 6,145,066 | A |   | 11/2000 | Atkin ......................... 711/165 |
| 6,199,074 | B1 |  | 3/2001  | Kern et al. ................. 707/204 |
| 6,629,264 | B1 | * | 9/2003  | Sicola et al. .................. 714/15 |
| 6,643,795 | B1 | * | 11/2003 | Sicola et al. ................... 714/6 |
| 6,732,289 | B1 | * | 5/2004  | Talagala et al. ............... 714/6 |
| 2002/0112198 | A1 | * | 8/2002 | Lim et al. ...................... 714/7 |
| 2003/0093501 | A1 | * | 5/2003 | Carlson et al. ............. 709/220 |
| 2003/0126315 | A1 | * | 7/2003 | Tan et al. ...................... 710/1 |
| 2003/0188233 | A1 | * | 10/2003 | Lubbers et al. ............. 714/100 |

\* cited by examiner

*Primary Examiner*—Scott Baderman
*Assistant Examiner*—Paul Contino
(74) *Attorney, Agent, or Firm*—Lily Neff; Cantor Colburn LLP

(57) ABSTRACT

A system and method for concurrently performing logical device swaps for at least one logical subsystem, comprising: concurrently performing the following for each logical subsystem of each computer system prior to the occurrence of an event calling for logical device swaps—receiving a list of data storage device pairs, each pair comprising a first device and a corresponding second device and placing each listed second data storage device into a pseudo-online state; and concurrently performing the following for each logical subsystem of each computer system upon the occurrence of an event calling for logical device swaps—replacing a binding to each listed first device with a binding to each corresponding listed second device, wherein the binding causes I/O requests to be directed to the listed first device prior to the replacement, and further wherein the binding causes I/O requests to be directed to the corresponding listed second device subsequent to the replacement.

21 Claims, 4 Drawing Sheets

SYSTEM AND METHOD FOR CONCURRENT LOGICAL DEVICE SWAPPING

This disclosure is related to U.S. Pat. No. 5,870,537, "Concurrent Switch to Shadowed Device for Storage Controller and Device Errors", assigned to the assignee of the present application, the contents of which are herein incorporated by reference.

CROSS REFERENCES TO RELATED APPLICATIONS

This disclosure is related to U.S. patent application Ser. No. 10/134,414, "System and Method for Automatic Dynamic Address Switching", filed Apr. 29, 2002 and assigned to the assignee of the present application, the contents of which are herein incorporated by reference.

BACKGROUND

Continuous availability (CA) is the attribute of a system or cluster of systems to provide high availability (i.e., mask unplanned outages from an end-user perspective) and continuous operations (i.e., mask planned maintenance from an end-user perspective). Attempts to achieve these attributes have been made utilizing hardware by enabling a system for redundancy with such mechanisms as multiple servers, multiple coupling facilities (CFS), multiple sysplex timers, multiple channel paths spread across multiple switches, etc. Attempts to achieve these attributes have been made utilizing software by enabling a system for software redundancy with redundant z/OS (IBM's operating system for the mainframe environment that operates on zSeries processor) images and multiple software subsystems per z/OS, etc.

Existing CA systems generally comprise disk subsystems that are a single point of failure. For example, where there is only one copy of disk resident data and the disk subsystem becomes nonfunctional for any reason, the system and/or the applications executing therein typically experience an outage even when the system's other components are redundant or fault tolerant. Some CA systems, including those comprising synchronous disk mirroring subsystems, such as those supporting Peer to Peer Remote Copy (PPRC) functions, reduce the opportunity for outages by having two copies of the data and the cluster spread across two geographical locations.

There are several types of outages that a CA system may experience. A first type of outage is a disk subsystem failure. If a PPRC enabled system experiences a primary disk subsystem failure (i.e., the primary disk subsystem is inaccessible causing an impact on service), required repairs can be performed on the primary disk subsystem while simultaneously performing a disruptive failover to use the secondary disk subsystem. Restoration of service typically requires less than one hour, which compares favorably to non-PPRC systems that typically require several hours before service can be restored. In addition, non-PPRC systems may experience logical contamination, such as permanent Input/Output (I/O) errors, which would also be present on the secondary PPRC volume and would require a data recovery action prior to the data being accessible. For example, IBM DB2 will create a Logical Page List (LPL) entry for each table space that receives a permanent I/O error for which recovery is required. Referring again to a system enabled with PPRC, once the primary disk subsystem is repaired the original PPRC configuration is restored by performing a disruptive switch or using existing PPRC/dynamic address switching functions.

A second type of outage that may be experienced is a site failure wherein the failed site includes disk subsystems necessary for continued operations. When a PPRC enabled system experiences a site failure because for example, z/OS images within a site become nonfunctional or the primary PPRC disk subsystem(s) are inaccessible, the operator on the PPRC enabled system can initiate a disruptive failover to the surviving site and restore service within one hour. When the failed site is restored, the original PPRC configuration is restored by performing a disruptive switch or using existing PPRC/dynamic address switching (P/DAS) functions.

A third type of outage that may be experienced is caused by disk subsystem maintenance. When a PPRC enabled system requires disk subsystem maintenance, there are at least two methods for proceeding. The operator may perform a disruptive planned disk switch to use the secondary disk subsystem restoring service typically in less than one hour. The majority of PPRC systems use this technique to minimize the time when their disaster recovery (D/R) readiness is disabled. The system may also use existing PPRC P/DAS functions to transparently switch the secondary disk subsystem into use.

Existing PPRC and z/OS P/DAS mechanisms process each PPRC volume pair switch sequentially as a result of z/OS Input/Output Services Component serialization logic thus requiring approximately twenty to thirty seconds to switch each PPRC pair. A freeze function is issued to prevent I/O disabled for the duration of the P/DAS processing due to primary disks being spread across two sites, resulting in the potential for a lack of Disaster Recovery (D/R) readiness lasting for a significant period of time. For example, assuming that a PPRC enterprise wanted to perform maintenance on one disk subsystem that contained 1024 PPRC volumes and P/DAS were used to perform a transparent switch, the elapsed P/DAS processing time would be equal to 5.7–8.5 hours (1024 volumes* 20–30 seconds processing time per volume pair). Additionally, there are requirements, as described in the IBM publication DFSMS/MVS V1 Advanced Copy Services (SC35-0355), that must be met for P/DAS to work thereby making it very unlikely that a production PPRC disk subsystem pair can be switched using P/DAS without manual intervention. Because many enterprises are unable to tolerate having their D/R readiness disabled for several hours, they often elect to perform a disruptive planned disk switch instead of using the P/DAS function. Once the disk subsystem maintenance is completed, the operator will restore the original PPRC configuration by performing a disruptive switch or use the existing P/DAS function.

The present invention provides a continuous availability solution (in the event of a primary disk subsystem failure and planned maintenance) for transparent disaster recovery for both uni-geographically and multi-geographically located disk subsystems.

SUMMARY OF THE INVENTION

A system and method for concurrently performing logical device swaps for at least one logical subsystem, comprising: concurrently performing the following for each logical subsystem of each computer system prior to the occurrence of an event calling for logical device swaps—receiving a list of data storage device pairs, each pair comprising a first device and a corresponding second device and placing each listed second data storage device into a pseudo-online state; and concurrently performing the following for each logical subsystem of each computer system upon the occurrence of an event calling for logical device swaps—replacing a binding to each listed first device with a binding to each corresponding listed second device, wherein the binding causes I/O requests to be directed to the listed first device prior to the replacement, and further wherein the binding causes I/O requests to be directed to the corresponding listed second device subsequent to the replacement.

DETAILED EMBODIMENT

Figure 1:
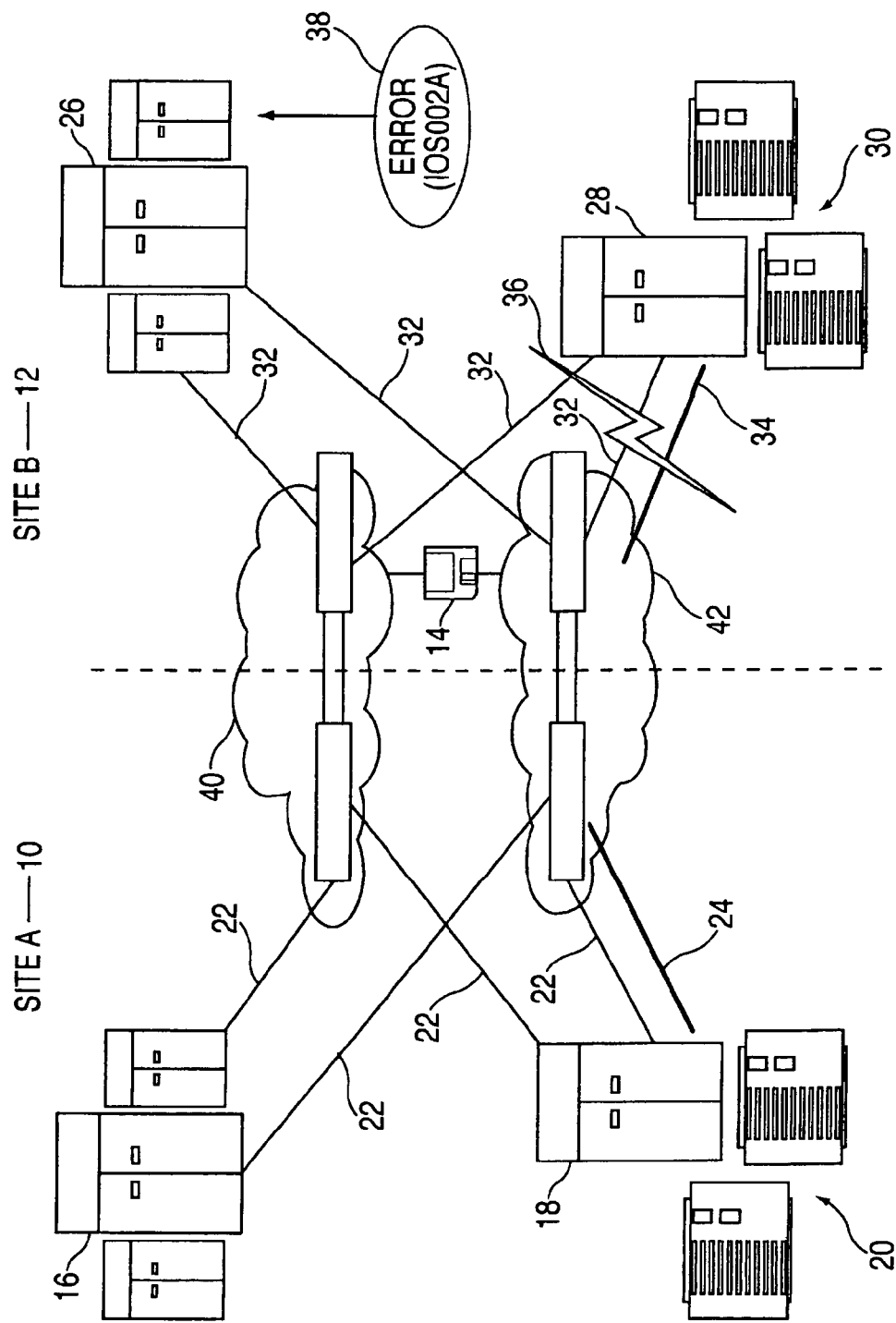
FIG. 1 shows a geographically dispersed logical subsystem enabled for concurrent logical device swapping across multiple systems.

Peer-to-Peer Dynamic Address Switching (P/DAS) is a z/OS operating system function based on Dynamic Device Reconfiguration (DDR) and Peer-to-Peer Remote Copy (PPRC). It provides a means for installations to non-disruptively switch between devices in a duplex pair when the primary device needs to be made unavailable for reasons such as performing service or migrating from one subsystem to another. P/DAS requires a device to be released (i.e. not actively reserved) prior to P/DAS's execution of operations on the device. P/DAS performs various operations serially (i.e. operates on one device at a time) in order to manage the PPRC state of a set of devices. When a Geographically Dispersed logical subsystem is utilized by an enterprise, a common solution for completing P/DAS functions is to suspend or terminate the applications requiring I/O access to data stored on the devices, perform operations including breaking the PPRC connections among the devices, and restarting the applications whereby the applications I/O access requests are redirected to the secondary volumes. These operations generally require approximately fifteen seconds per device, plus one to two additional seconds for each system comprising the cluster. As a result, several thousand PPRC pairs, for example, will exceed the maximum amount of allotted time for continuous availability system requirements. In addition, P/DAS requires automation routines to provide multi-system serialization via the IOACTION operator command in order to provide a synchronization point for all systems to switch devices at the same time in order to insure data consistency.

In addition to PPRC, RAID5 disk subsystems may be used to provide for fault tolerance. However, RAID subsystems are also subject to failure. Such failures may be due to errors in Licensed Internal Code (LIC, or micro-code) which is itself a single point of failure. Additionally, a typical RAID5 disk subsystem is deployed to a single geographic location and thus is not likely to withstand geographical disasters (e.g. earth quakes, floods, bombs, etc.).

An exemplary embodiment of the invention provides for improving PS, CA, and D/R attributes by masking logical subsystem outages while eliminating the need for several P/DAS requirements. An exemplary system and method of the present invention masks primary PPRC disk subsystem problems and planned storage subsystem maintenance activities. In addition, an exemplary embodiment provides for the completion of such tasks prior to or without causing an application or data request time-outs and prior to or without causing an application or data error. For example, when a system is enabled for PPRC and a primary PPRC disk subsystem experiences a problem, the present invention provides for automatically switching to use the secondary PPRC disk subsystem. When the same operator wants to perform a maintenance action against a primary PPRC disk subsystem, the present invention provides for transparently switching to use the secondary PPRC disk subsystem. For purposes of clarity and explanation, it is understood that in-parallel (hereinafter "concurrent") computer applications, programs, tasks, operations, and/or processes refers to the concurrent execution of two or more of the same. Furthermore, it is understood to one of ordinary skill in the art that concurrency may be synchronous or asynchronous and that computer applications, programs, tasks, operations, and/or processes may initiate, execute, and terminate independent of one another.

A performance objective of the present invention is for the performance of all PPRC pair swaps for a Logical Subsystem (LSS) up to 256 PPRC volume pairs within five seconds and up to the maximum number of LSSes (32,000 PPRC) within thirty seconds for any outage. An LSS may be identified using subsystem identifiers (SSIDs). Such performance satisfies the business requirements of customers who are unable to tolerate longer-term system and/or application suspension. It is understood that these performance objectives are merely exemplary and not intended to limit embodiments of the invention. When compared to the current multi-hour outages experienced by many enterprises relating to disk subsystem failure or 85 second spin loops (the default spin loop factor of z/OS images LPAR), the present invention provides for significantly more functionality.

FIG. 1 shows an exemplary geographically dispersed logical subsystem enabled for concurrent logical device swapping across multiple systems. Site A at 10 includes computers/processors 16 and storage devices 18, 20 connected to data networks 40, 42 via data communications lines 22. Site B at 12 includes computers/processors 26 and storage devices 28, 30 connected to data networks 40, 42 via data communications lines 32. The storage devices of site A at 18, 20 and site B at 28, 30 are also in communication via PPRC links 24, 34. It is understood that PPRC links 24 and 34 are exemplary and the lack thereof does not exceed the scope of the present disclosure. Under exemplary circumstances wherein primary storage devices 28, 30 are located at site B at 12, a failure 36 is detected from Input/Output Supervisor (IOS) symptoms such as those causing IOS002A message 38 indicating that storage devices 28, 30 do not have operational paths with which to communicate with the remainder of the geographically dispersed storage subsystem. In an exemplary embodiment, computer program code for concurrent logical device swapping is located in a computer usable storage medium 14 that is in communication with and accessible by at least one computer/processor 16, 26 via a propagated data communication signal.

Figure 2:
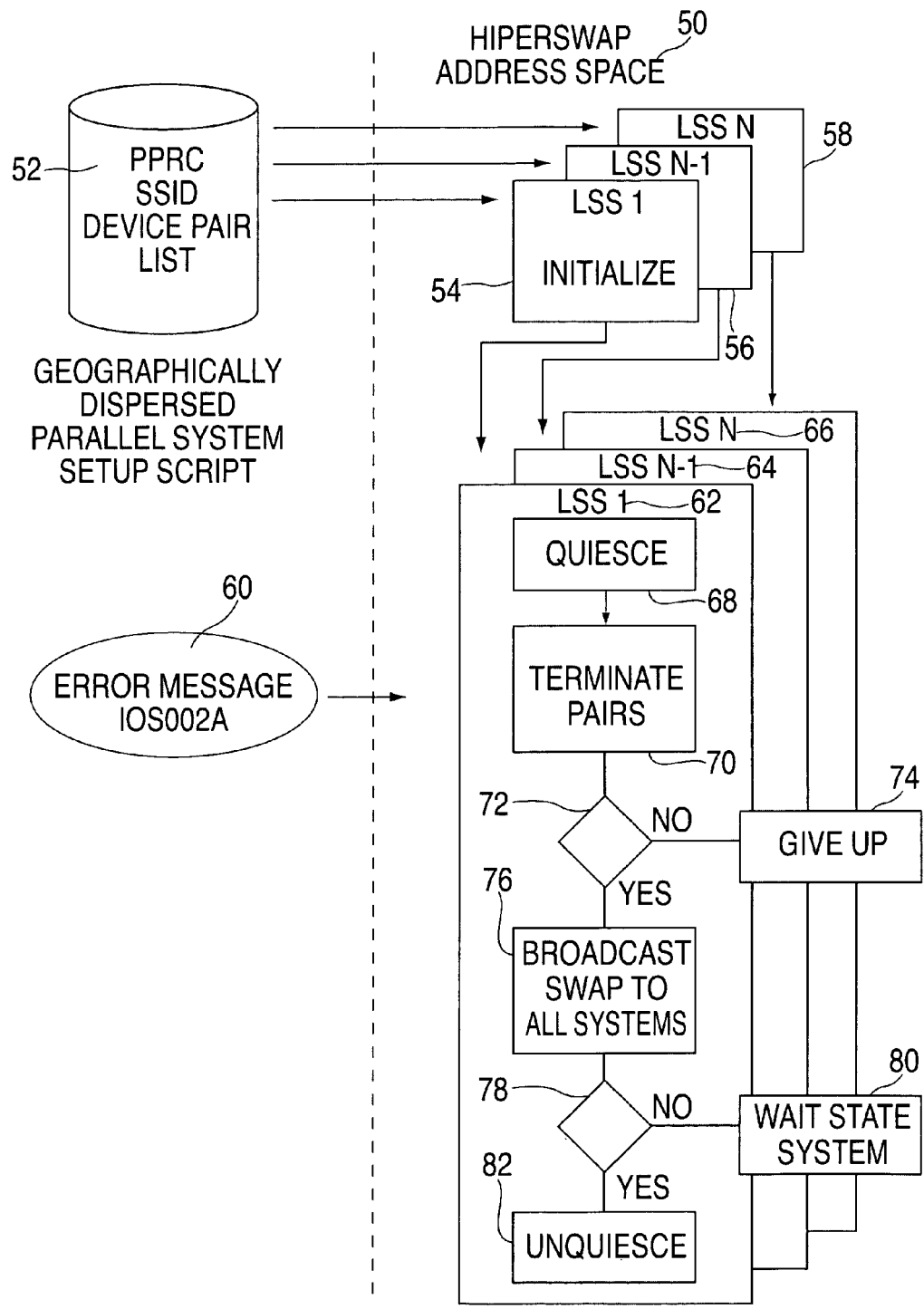
FIG. 2 is a flow chart showing exemplary steps for concurrent logical device swapping across multiple systems.

FIG. 2 is a flow chart showing exemplary steps for concurrent logical device swapping across multiple systems. It is understood that the method of the claimed invention is to be implemented concurrently and in-parallel across multiple computer systems and multiple logical subsystems. Furthermore, while for purposes of explanation and example, FIG. 2 shows exemplary steps for a single computer system comprising multiple LSSes. It is understood that the embodiment envisioned by FIG. 2 comprises multiple computer systems. A system address space at 50 is created executing instructions for concurrent logical device swapping. When an exemplary system enabled with the present invention initializes, it invokes separate initialization functions for each logical subsystem (LSS) at 54, 56, 58. It is understood that the initialization of each logical subsystem at 54, 56, 58 is performed simultaneously and asynchronously relative to the initialization functions of the other LSSes. For the present example, a separate process is spawned for initializing the device state of all devices belonging to a given LSS. For purposes of explanation, the initialization function is described for LSS 1 at 54. It is understood that the initialization function for LSS n–1 at 56 and LSS n at 58 each comprises the steps described for LSS 1 at 54. These steps include passing a list of all primary-secondary device pairs at 52 for each LSS 1 at 54. Hiper-Swap creates internal control blocks to keep track of the primary-secondary device pairs and their state. The secondary devices are then validated as to what primary device each secondary device is paired to. If the physical state matches the logical definition then the secondary devices are placed in a pseudo-online state so that they can be rapidly swapped with failed corresponding primary devices. It is understood that the initialization steps described herein are completed prior to the occurrence of a failure thereby reducing the number of steps and the amount of time necessary for recovery from the failure.

When a failure occurs, various system messages such as IOS002A at 60, are generated. For the present example, a separate process is spawned for swapping all the PPRC pairs belonging to each LSS. Upon receiving such a message the processor invokes HiperSwap swapping functions for each LSS at 62, 64, 66. It is understood that the swapping functions for each LSS at 62, 64, 66 are performed simultaneously and asynchronously relative to the swapping functions performed for the other LSSes. For purposes of explanation, the swapping functions are described for LSS 1 at 62. It is understood that the swapping functions for LSSes n–1 at 64 and LSS n at 66 each comprises the steps described for LSS 1 at 62.

Upon error detection, the processor issues a command to the LSS causing the suspension of all I/O at 68. A time consistent copy of data with respect to transactions is obtained. Primary-secondary copy sessions are terminated at 70 using I/O commands issued to the working secondary device. If the termination is successful, the terminated pair devices are logically swapped at 76. If the termination is not successful at 72, the swapping function ceases at 74. All the remaining device pairs are logically swapped at 76. If logical swapping is successful at 78, I/O activity is resumed at 82. If logically swapping is not successful, the system is placed into a wait state at 80.

Figure 3:
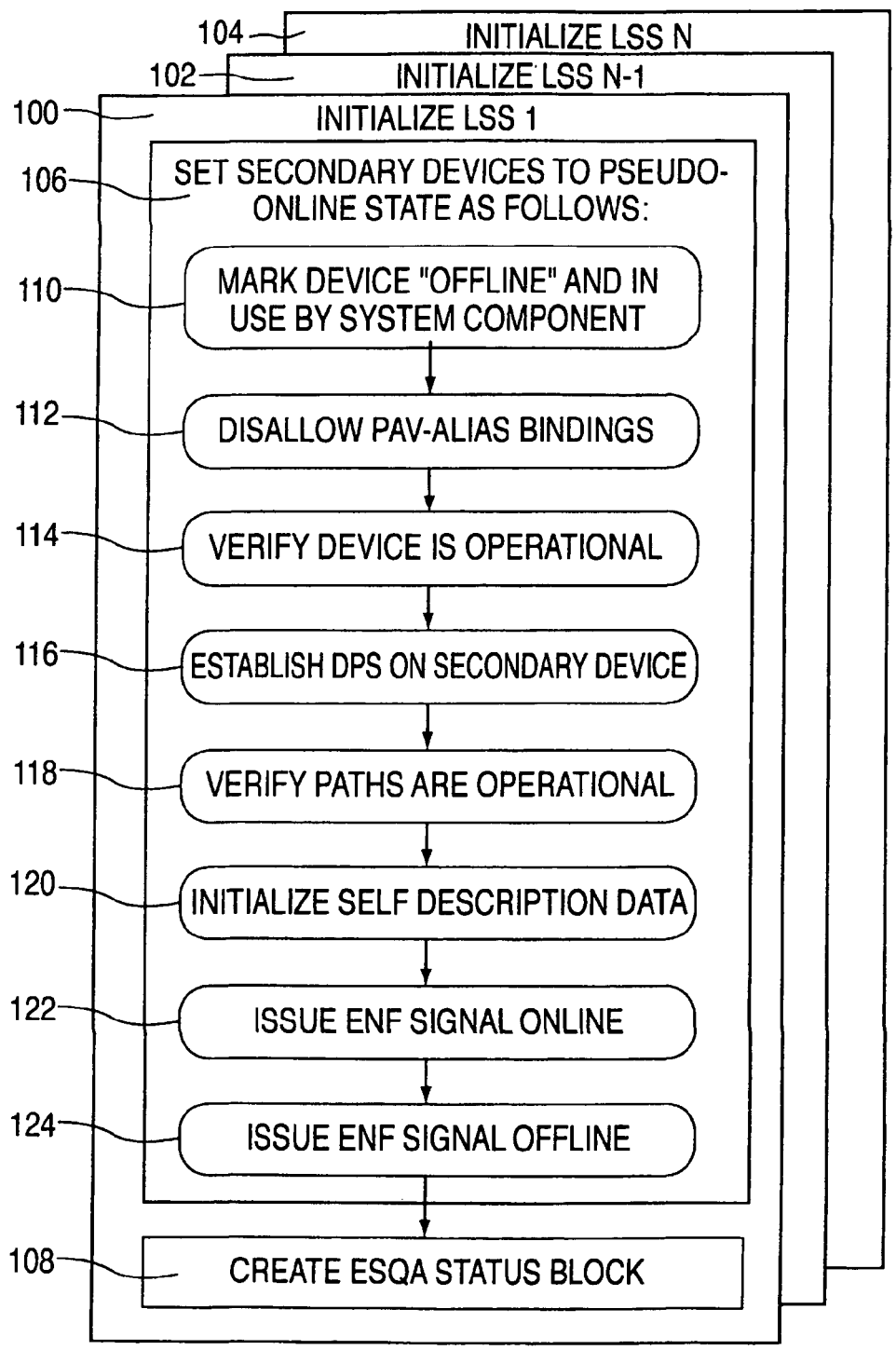
FIG. 3 shows the Initialization step of FIG. 2 in greater detail.

FIG. 3 shows the initialization at step 54 of FIG. 2 in greater detail. For purposes of explanation, initialization is described for LSS 1 at 100. It is understood that the initialization of LSS n–1 at 102 and LSS n at 104 each comprises the steps described for LSS 1 at 100. LSS 1 has state information created for it in an Extended System Queue Area (ESQA). Each secondary device is set into a pseudo-online state at 106 and an ESQA status block is created for LSS 1 at 108. Step 106 further comprises the following sub-steps for each device pair in LSS 1. The primary device is marked "offline and in use by the system component" at 110. Parallel access volume alias device (PAV-ALIAS) bindings are disallowed at 112. This is done because a swap cannot occur for a PAV device when aliases are bound to it. The device is verified as operational at 114. Dynamic pathing selection (DPS) is established on the device at 116. DPS forms path groups at the device that allow reconnection to the device via any available communications link pathway after disconnection and system reserves. Available pathways are verified as operational at 118. Self description data is initialized at 120. An event notification facility (ENF) online signal is issued at 122 to indicate that the device is online and to allow for updating of the tables. A device to be utilized or swapped by the system must first be made known to the system. This is achieved via an ENF signal. Devices that may be used or swapped to must be made know to the system so different components are prepared for when the device is eventually put into use. An event notification facility (ENF) offline signal is issued at 124 to signal that the secondary device is not available for use offline.

Figure 4:
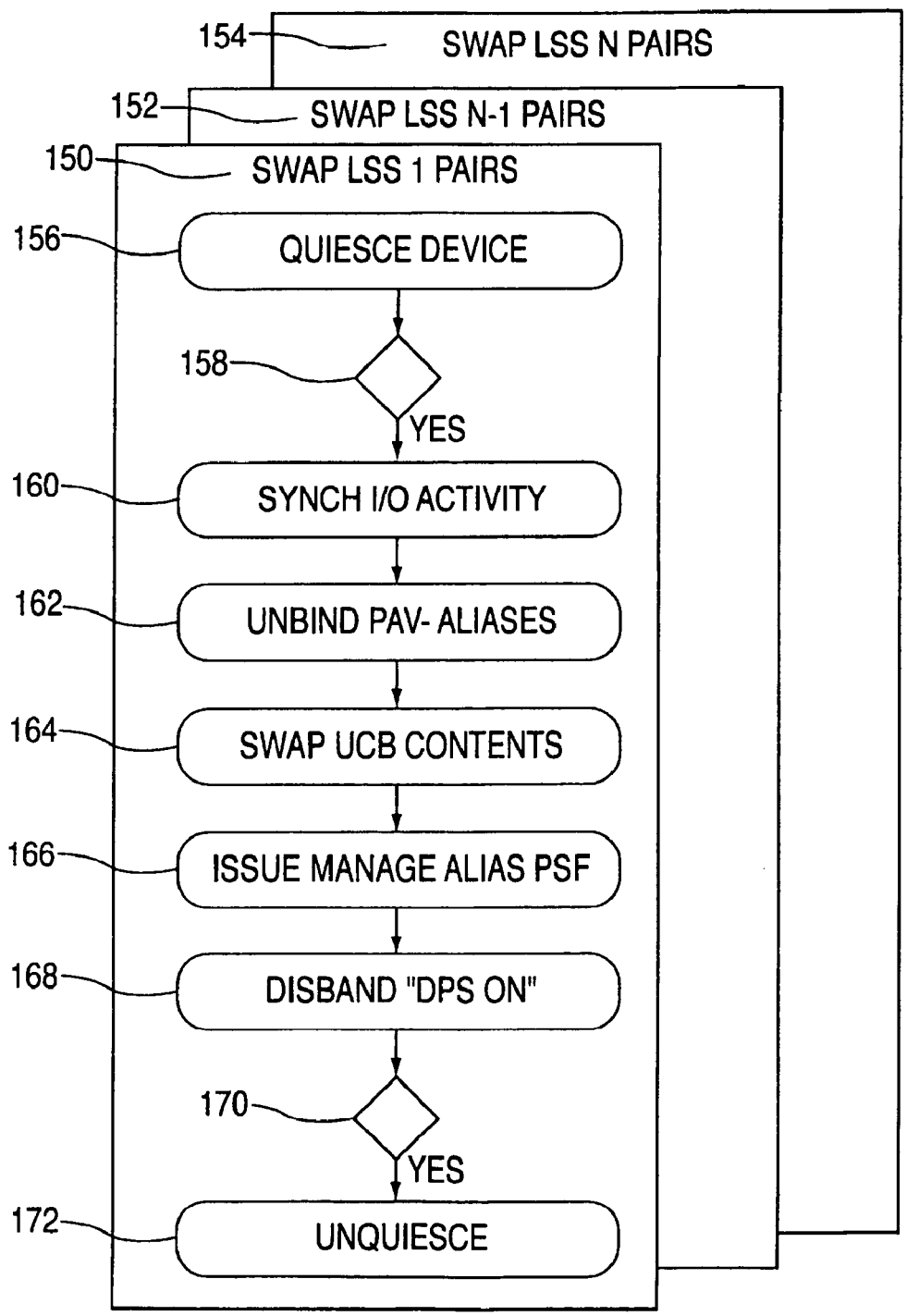
FIG. 4 shows the Swap step of FIG. 2 in greater detail.

FIG. 4 at 150 shows the swap step at 76 of FIG. 2 in greater detail. It is understood that the swapping of devices for LSS n–1 at 152 and LSS n at 154 each comprises the steps described for LSS 1 at 150. For each device pair belonging to LSS 1, the following steps are performed. If a step fails to successfully complete, swapping is terminated without executing subsequent steps for that device pair. A device pair is quiesced at 156 to prevent the execution of additional I/O requests. Once the device pair is idle at 158, I/O activity for the device pair is synchronized at 160 thus allowing already active I/O requests to complete. PAV-Aliases are unbound from the primary device of the device pair at 162 to allow swapping for device. A Unit Control Block (UCB) is a software representation for a device. The UCB contents of the device pair are swapped at 164. Applications requiring I/O access to the device pair do so via a UCB. Thus, swapping the UCBs physical addressing information (i.e. subchannel number) from the primary to the secondary device redirects the application's I/O requests to the secondary device. A "manage alias PSF" command is issued at 166 to bind to force a device state transition interrupt from all aliases for the secondary device. The DST will drive the alias binding process. "DPS on" is disbanded from the old primary device at 168. If it is determined at 170 that the primary device was quiesced on entry during step 156, the primary device is unquiesced (i.e. resumed) at 170.

One of ordinary skill in the art will recognize computer functions as computer programming implements consisting of computer program code that when executed performs some function as desired by a the programmer of the computer program code. In an exemplary embodiment, a system for carrying out the exemplary steps already described for FIGS. 2 through 4 includes the following exemplary computer functions.

Function 0: query to determine that the HiperSwap application programming interface (APIs) are functional or not.

Function 1: add one or more SSIDs with its PPRC pairs to the master list and put the secondary devices in the pseudo online state.

Function 2: this sends the terminate PPRC pairs order to all of the devices in one or more SSIDS.

Function 3: do the DDR swap on all of the PPRC pairs in one or more SSIDs. Remove from the master list if function 5 is not done.

Function 4: remove pseudo online state for all of the devices of one (undoes function 1).

Function 5: quiesce disk I/O activity—this will quiesce disk I/O activity by changing the UCBLEVEL to the DDR level for each primary and secondary PPRC volume's unit control block (UCB) in the specified PPRC SSID pairs to prevent I/O.

Function 6: resume disk I/O activity by resuming any quiesced disk I/O activity by changing the UCBLEVEL to normal level for all the primary and secondary devices in one or more SSID's.

Each of the preceding exemplary computer functions can be called multiple times. It is preferable to call Function 1 prior to calling other functions for any SSID because Function 1 includes a list of PPRC pairs while the other function only have a list of SSIDs to perform their function on.

In an exemplary embodiment, computer functions for carrying out the present invention are programmed using the REXX (restructured extended executor) programming language, which is typically used for developing mainframe and/or MVS computer programs. It is understood that computer functions for carrying out the exemplary method described herein may be written in any computer programming language known to one of ordinary skill in the art. An exemplary computer program builds control blocks and issues a cross memory PC instruction to initiate requested HiperSwap functions. The parameters on the call to the interface program are the function code number and the stem variable. The following is an exemplary REXX computer program for performing Function 1 and Function 2. It is understood that any computer programming language or combination of computer programming languages known to one of ordinary skill of the art may be used including but not limited to assembly, C, C++, or Java. The SSID names are any four alphanumeric characters. The PPRC pairs are eight hex digits. The first four hex digits are the device number for the primary device, the second four hex digits are the device number for the secondary device. The highest return code is returned in a REXX variable.

| Sample Computer Program Code | |
|---|---|
| PPRC.PAIRS.0 = 2 | /* Set number of SSIDs */ |
| PPRC.PAIRS.1 = 'AAAA' | /* Set SSID   */ |
| PPRC.PAIRS.2 = 'BBBB' | /* Set SSID   */ |
| PPRC.PAIRS.AAAA.0 = 2 | /* Set number of PPRC pairs */ |
| PPRC.PAIRS.AAAA.1 = 'CA16CB16'X | /* Set PPRC pair */ |
| PPRC.PAIRS.AAAA.2 = 'CA17CB17'X | /* Set PPRC pair */ |
| PPRC.PAIRS.bbbb.0 = 2 | /* Set number of PPRC pairs */ |
| PPRC.PAIRS.bbbb.1 = 'CA18CB18'X | /* Set PPRC pair */ |
| PPRC.PAIRS.bbbb.2 = 'CA19CB19'X | /* Set PPRC pair */ |
| call rexxdrvr 1, "PPRC.PAIRS" | /* Call REXX interface rtn   */ |
| call rexxdrvr 2, "PPRC.PAIRS" | /* Call REXX interface rtn */ |

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

The invention claimed is:

1. A method of performing concurrent logical device swapping for at least one logical subsystem of at least one computer system, each said logical subsystem including at least one pair of devices, the method comprising:
   performing an initialization for said logical subsystem, the initialization including:
      receiving a list of data storage device pairs, each said pair comprising a first device and a corresponding second device, and
      placing each said listed second data storage device into a pseudo-online state; and
   concurrently performing a logical swap for one or more of each said logical subsystems of one or more of each said computer systems, the logical swap including:
      concurrently replacing a binding to each said listed first device with a binding to each said corresponding listed second device, wherein said binding causes I/O requests to be directed to said listed first device prior to said replacement, and further wherein said binding causes I/O requests to be directed to said corresponding listed second device subsequent to said replacement.

2. A method as in claim 1 wherein said initialization is performed concurrently for multiple logical subsystems and multiple computer systems.

3. A method as in claim 1 wherein said logical swap is performed concurrently for multiple logical subsystems and multiple computer systems.

4. A method as in claim 1 further comprising:
   synchronizing I/O activity among said listed first and second devices;
   unbinding aliases to said listed first devices; and
   binding said unbound aliases to said listed second devices.

5. A method as in claim 1 wherein said placing each said listed second device into a pseudo-online state further comprises marking said listed second devices as in use, whereby said marking prevents execution of additional I/O requesis, said I/O requests being issued subsequent to said marking.

6. A method as in claim 1 wherein said logical swapping is performed by a processor, said processor being in communication with said logical subsystem, said communication via a data communications link.

7. A method as in claim 6 wherein said logical swapping is performed by a processor being located in a geographically separate location from said first devices and from said second devices.

8. A method as in claim 6 wherein said processor executes a mainframe operating system.

9. A method as in claim 1 wherein said swaps occur prior to and without causing an application or data request time-out.

10. A method as in claim 1 wherein said swaps occur without causing an application or data request error.

11. A storage medium encoded with machine-readable computer program code for performing concurrent logical device swapping for at least one logical subsystem, each said logical subsystem including at least one pair of devices, the storage medium including instructions for causing a processor to implement a method comprising:

performing an initialization for each logical subsystem of each computer system, the initialization including:
receiving a list of data storage device pairs, each said pair comprising a first device and a corresponding second device, and
placing each said listed second data storage device into a pseudo-online state; and
concurrently performing a logical swap for one or more of each said logical subsystems of one or more of each said computer systems, the logical swap including:
concurrently replacing a binding to each said listed first device with a binding to each said corresponding listed second device, wherein said binding causes I/O requests to be directed to said listed first device prior to said replacement, and further wherein said binding causes I/O request to be directed to said corresponding listed second device subsequent to said replacement.

12. A storage medium as in claim 11 wherein said initialization is performed concurrently for multiple logical subsystems.

13. A storage medium as in claim 11 wherein said logical swap is performed concurrently for multiple logical subsystems.

14. A system for performing concurrent logical device swapping, the system comprising:

at least one logical subsystem of at least one computer system, each said logical subsystem including at least one pair of data storage devices; and
a processor for implementing a method comprising:
performing an initialization for said logical subsystem, the initialization including:
receiving a list of the data storage device pairs, each said pair comprising a first device and a corresponding second device, and
placing each said listed second data storage device into a pseudo-online state; and
concurrently performing a logical swap for one or more of each said logical subsystems of each said computer systems, the logical swap including:
concurrently replacing a binding to each said listed first device with a binding to each said corresponding listed second device, wherein said binding causes I/O requests to be directed to said listed first device prior to said replacement, and further wherein said binding causes I/O requests to be directed to said corresponding listed second device subsequent to said replacement.

15. A system as in claim 14 wherein said initialization is performed concurrently for multiple logical subsystems.

16. A system as in claim 14 wherein said logical swap is performed concurrently for multiple logical subsystems.

17. A system as in claim 14 wherein said processor executes a mainframe operating system.

18. A system as in claim 14 wherein said processor is located in a geographically separate location from said first device and from said second device.

19. A system as in claim 14 wherein said processor implements the method using computer program code written in at least one of the following computer programming languages; REXX, assembly, C, C++, or Java.

20. A system as in claim 14 wherein said swaps occur prior to and without causing an application or data request time-out.

21. A system as in claim 14 wherein said swaps occur without causing an application or data request error.

* * * * *